(12) United States Patent
Whipple et al.

(10) Patent No.: US 6,392,513 B1
(45) Date of Patent: May 21, 2002

(54) CIRCUIT BREAKER WITH COMMON TEST BUTTON FOR GROUND FAULT AND ARC FAULT CIRCUIT

(75) Inventors: Michael Jerome Whipple, Rochester; Ralph Mason Ennis, Imperial, both of PA (US)

(73) Assignee: Eaton Corporation, Cleveland, OH (US)

( * ) Notice: Subject to any disclaimer, the term of this patent is extended or adjusted under 35 U.S.C. 154(b) by 181 days.

(21) Appl. No.: 09/069,355

(22) Filed: Apr. 29, 1998

(51) Int. Cl.$^7$ ............................................... H01H 73/00
(52) U.S. Cl. ......................................................... 335/18
(58) Field of Search ................. 335/18, 17; 364/42–51, 364/90, 93

(56) References Cited

U.S. PATENT DOCUMENTS

| | | | |
|---|---|---|---|
| 4,686,600 A | * | 8/1987 | Morris et al. ................... 361/42 |
| 4,823,225 A | * | 4/1989 | Foster et al. ................... 361/42 |
| 4,851,951 A | * | 7/1989 | Foster, Jr. ...................... 361/50 |
| 5,260,676 A | | 11/1993 | Patel et al. |
| 5,293,522 A | * | 3/1994 | Fello et al. .................... 335/18 |
| 5,546,226 A | * | 8/1996 | Mackenzie et al. ........... 361/93 |

* cited by examiner

*Primary Examiner*—Lincoln Donovan
(74) *Attorney, Agent, or Firm*—Martin J. Moran

(57) ABSTRACT

A miniature circuit breaker incorporating ground fault protection and arc fault protection has a common rocker button for selectively actuating a ground fault test switch and an arc fault test switch. A leaf spring seated in a groove in the rocker button has converging legs which bias the common rocker button from the ground fault test position, and in the opposite direction from the arc fault test position, respectively, toward a central, neutral position.

13 Claims, 5 Drawing Sheets

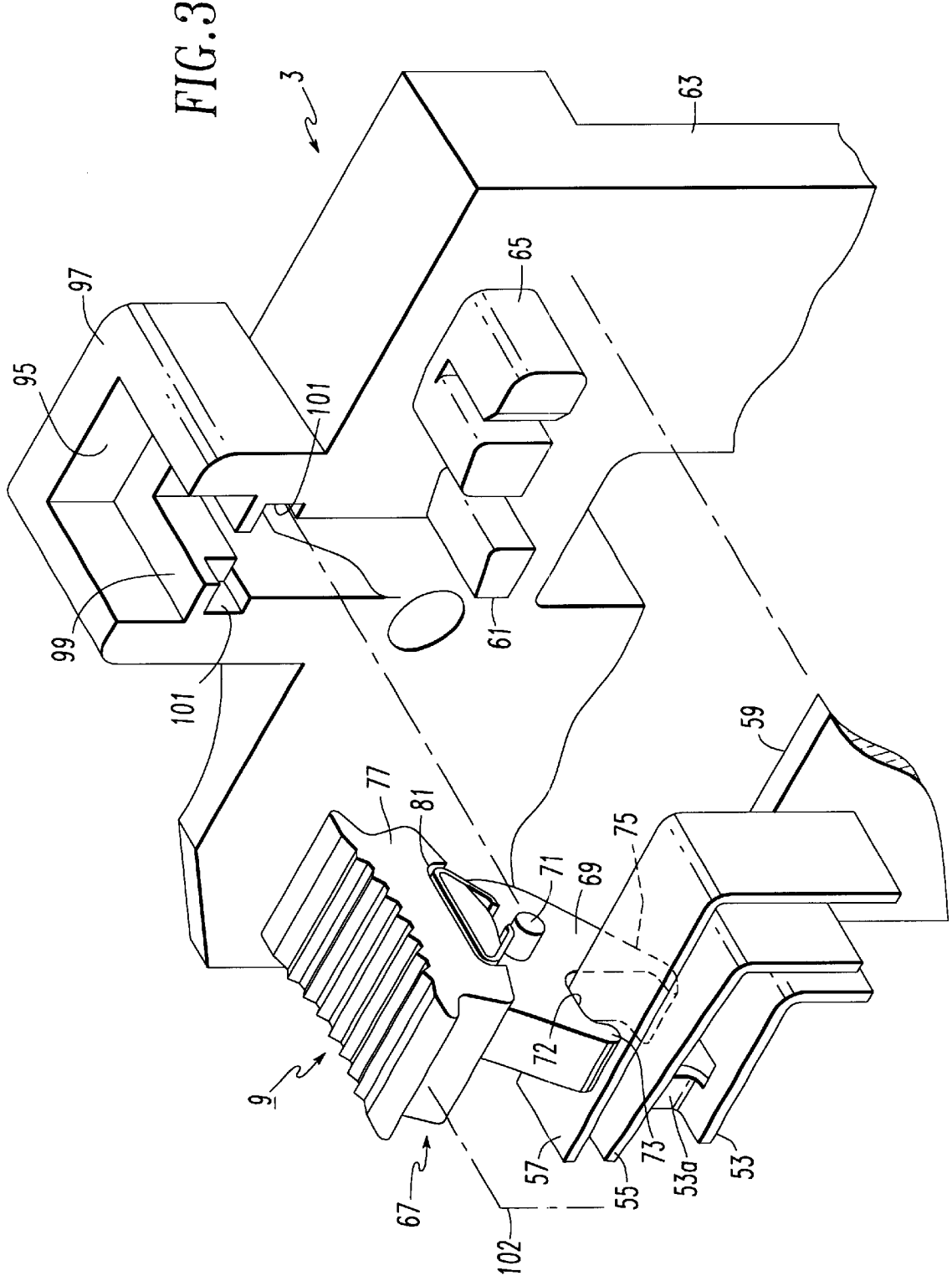

CIRCUIT BREAKER WITH COMMON TEST BUTTON FOR GROUND FAULT AND ARC FAULT CIRCUIT

BACKGROUND OF THE INVENTION

1. Field of the Invention

This invention relates to circuit breakers provided with both ground fault and arc fault trip circuits, and more particularly, to a common test button for actuating selectively a ground fault test circuit and an arc fault test circuit.

2. Background Information

Circuit breakers provide overcurrent and short circuit protection for electric power systems. In the small circuit breakers, commonly referred to as miniature circuit breakers, used for residential and light commercial applications, such protection is typically provided by a thermal-magnetic trip device. Such a device includes a bimetal which is heated and bends in response to a persistent overcurrent condition thereby unlatching a spring powered operating mechanism which opens the separable contacts of the circuit breaker to interrupt current flow in the protected power system. An armature attracted by the sizable magnetic forces generated by a short circuit also unlatches, or trips, the operating mechanism.

In many applications, the miniature circuit breaker also provides ground fault protection. An electronic circuit detects leakage of current to ground and generates a ground fault trip signal. This signal energizes a shunt trip solenoid which unlatches the operating mechanism, typically through actuation of the thermal-magnetic trip device.

Recently, there has been considerable interest in also providing protection against arcing faults. Arcing faults are intermittent high impedance faults which can be caused for instance by worn insulation, loose connections, broken conductors, and the like. Because of their intermittent and high impedance nature, arcing faults do not generate currents of sufficient instantaneous magnitude or sufficient average current to trigger the thermal-magnetic trip device. Consequently, separate electrical circuits have been developed for responding to arcing faults.

Ground fault protection circuits and arc fault protection circuits typically include test circuits for affirming their continued operability. Currently, separate test switches, each with its own test button, are provided for performing the ground fault and arc fault tests. However, the molded cases of the miniature circuit breakers have been standardized for interchangeable use in load centers. There is limited space available in the standardized miniature circuit breakers for all of the additional circuitry required for ground fault and arc fault protection, let alone the test circuits.

There is a need therefore for a circuit breaker providing ground fault and arc fault protection which has means for testing both the ground fault and arcing fault circuits and yet can be contained in the standardized molded cases of the miniature circuit breakers designed for use with existing load centers.

SUMMARY OF THE INVENTION

This need and others are satisfied by the invention which is directed to a circuit breaker incorporating ground fault protection having a ground fault test circuit and arc fault protection having an arc fault test circuit in which a common actuator selectively actuates a ground fault test switch and an arc fault test switch. The common actuator is preferably a rocker button which rotates in one direction from a neutral position to actuate the ground fault test switch, and rotates in the opposite direction from the neutral position to actuate the arc fault test switch. The common rocker button is biased to the neutral position preferably by a leaf spring having a first leg which biases the rocker button from a first position in which the ground fault test switch is actuated toward the neutral position and a second leg which biases the rocker button toward the neutral position from a second position in which the arc fault test switch is actuated. In a preferred form, the common rocker button has a body with a transversely extending pivot and the leaf spring has a center section extending transversely to an axis of the body extending through the pivot with the two legs converging toward the pivot and having confronting terminal portions.

Where the ground fault and arc fault test switches have spring arms forming one contact, the common rocker button has a first actuating finger which engages the spring arm of the ground fault test switch and a second actuating finger which engages the spring arm of the arc fault test switch. Preferably the common rocker button applies a preload to both of these spring arms with the rocker switch in the neutral position.

More particularly, the invention is directed to a circuit breaker having a housing, separable contacts mounted in the housing, an operating mechanism for opening the separable contacts in response to a trip signal, trip means for generating a trip signal in response to predetermined current conditions and including ground fault trip means for generating a trip signal in response to a ground fault and arc fault trip means for generating a trip signal in response to an arc fault. The circuit breaker further includes test means including a ground fault test circuit having a ground fault test switch for testing the ground fault trip means and an arc fault test circuit having an arc fault test switch for testing the arc fault means. A common test actuator is moveable to a first position for actuating the ground fault test switch and to a second position for actuating the arc fault test switch.

BRIEF DESCRIPTION OF THE DRAWINGS

A full understanding of the invention can be gained from the following description of the preferred embodiments when read in conjunction with the accompanying drawings in which:

FIG. 3 is an exploded fragmentary isometric view of a section of the molded housing of the circuit breaker illustrating the mounting of the common test button.

DESCRIPTION OF THE PREFERRED EMBODIMENTS

The invention will be described as applied to a single pole miniature circuit breaker of the type commonly used in residential and light commercial applications. However, it will be evident to those skilled in the art that the invention is also applicable to other types of circuit breakers as well.

Figure 1:
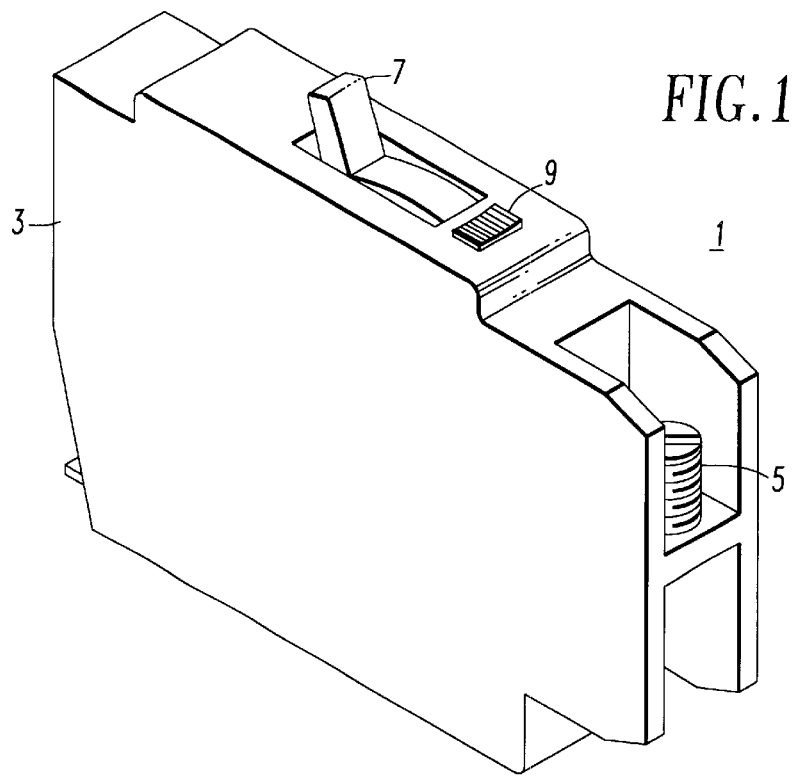
FIG. 1 is an isometric view of a circuit breaker incorporating the dual test button of the invention.

Referring to FIG. 1, the circuit breaker 1 includes a housing 3 which is assembled from a number of molded sections composed of an electrically insulating material, as is well known. Terminals 5 are provided at one end of the housing 3 for connecting the circuit breaker to a load. Line terminals (not shown) at the opposite end of the housing 3 connect the circuit breaker to a commercial power distribution system. A molded handle 7 projects from the housing for manually opening and closing the circuit breaker. A common test button 9 in accordance with the invention is also accessible through the housing.

Figure 2:
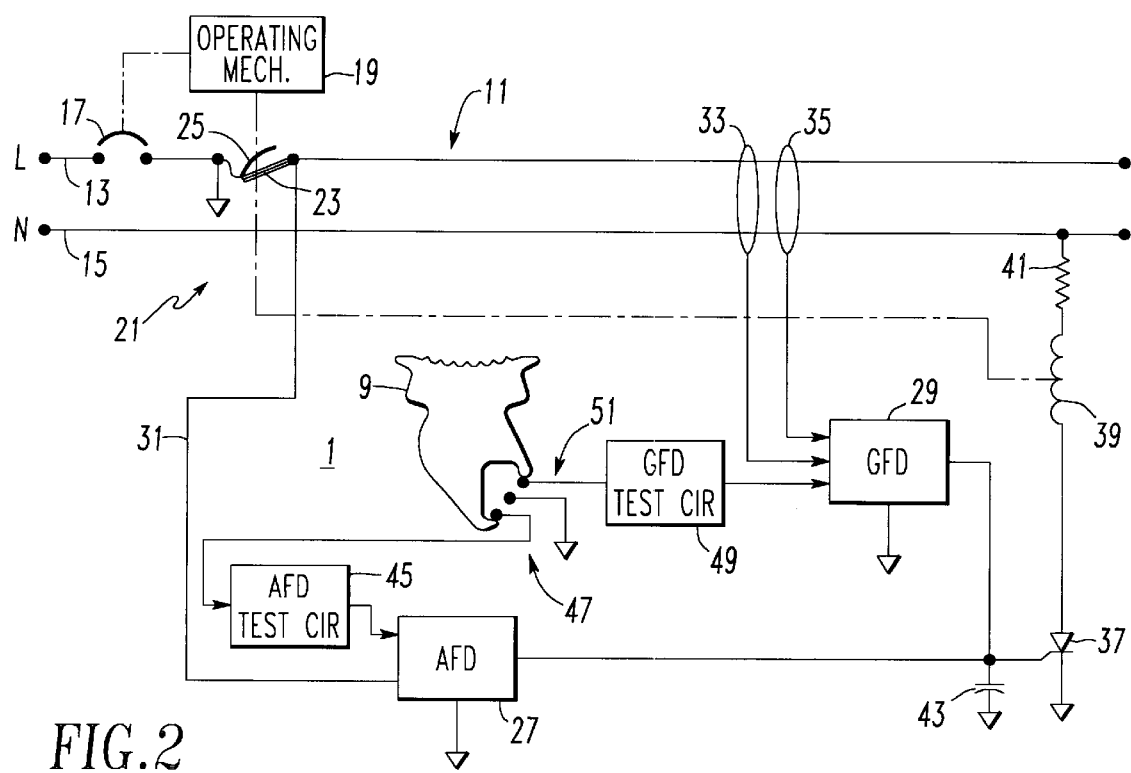
FIG. 2 is a schematic diagram of the circuit breaker of FIG. 1.

As shown in FIG. 2, the circuit breaker 1 is connected in an electric power system 11 which has a line conductor 13 and a neutral conductor 15. The circuit breaker includes separable contacts 17 which are connected in the line conductor 13. The separable contacts 17 are opened and closed by an operating mechanism 19. In addition to being operated manually by the handle 7, the operating mechanism can also be actuated to open the separable contacts 17 by a trip assembly 21. This trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The circuit breaker 1 is also provided with an arc fault detector (AFD) 27 and a ground fault detector (GFD) 29. The arc fault detector 27 may be, for instance, of the type which detects the step increases in current which occur each time an arc is struck, although other types of arc fault detectors could also be used. The arc fault detector senses the current in the electrical system 11 by monitoring the voltage across the bimetal 23 through the lead 31 in the manner described in U.S. Pat. No. 5,519,561. The ground fault detector 29 may be of the well known dormant oscillator type in which case it utilizes a pair of sensing coils 33 and 35 to detect both line to ground and neutral to ground faults. If the arc fault detector 27 detects an arcing fault in the electric power system 11, a trip signal is generated which turns on a switch such as the silicon controlled rectifier (SCR) 37 to energize a trip solenoid 39. Detection of a ground fault by the ground fault detector 29 generates a trip signal which also turns on the SCR 37 and energizes the trip solenoid 39. The trip solenoid 39 when energized actuates the operating mechanism 19 to open the separable contacts 17. A resistor 41 in series with the coil of the solenoid 39 limits the coil current and a capacitor 43 protects the gate of the SCR from voltage spikes and false tripping due to noise.

Both the arc fault detector 27 and the ground fault detector 29 have test circuits. The arc fault detector test circuit 45 provides signals to the arc fault detector 27 which mimic arc faults in the electrical system 11. The arc fault detector test circuit 45 is actuated by an arc fault test switch 47. The ground fault detector test circuit 49 when actuated by a ground fault test switch 51 generates a test signal which is applied to the ground fault detector 29. If the arc fault detector 27 and the ground fault detector 29 are operating properly, they should generate trip signals which open the separable contacts when the associated test circuit is actuated.

The arc fault test circuit 45 and the ground fault test circuit 49 are actuated alternatively by the common test button 9. The physical arrangement of the test switches and the common test button are shown in the remaining figures. As shown in FIG. 3, the arc fault test switch 47 includes a hot, electrically conductive arc fault spring contact arm 53 and a circuit breaker common electrically conductive spring contact 55 forming a second contact. The ground fault test switch 51 includes a hot, electrically conductive ground fault spring contact arm 57 and also utilizes the circuit breaker common spring contact 55 as the second contact. The spring contacts 53, 55 and 57 are mounted on a printed circuit board 59 mounted within the housing 3. The contacts 53, 55 and 57 are cantilevered from the printed circuit board 59 with their free ends in close parallel spaced relation and with the common contact 55 between the hot arc fault spring contact 53 and the hot ground fault spring contact 57. The contact 53 is supported by a molded projection 61 on the molded partition 63 which forms part of the housing 3. It has an offset portion 53a at the free end extending toward and then parallel to the common spring contact 55 for a purpose to be described. The ground fault contact 57 is positively positioned and supported by a slotted projection 65 also molded on the partition 63.

Figure 4A:
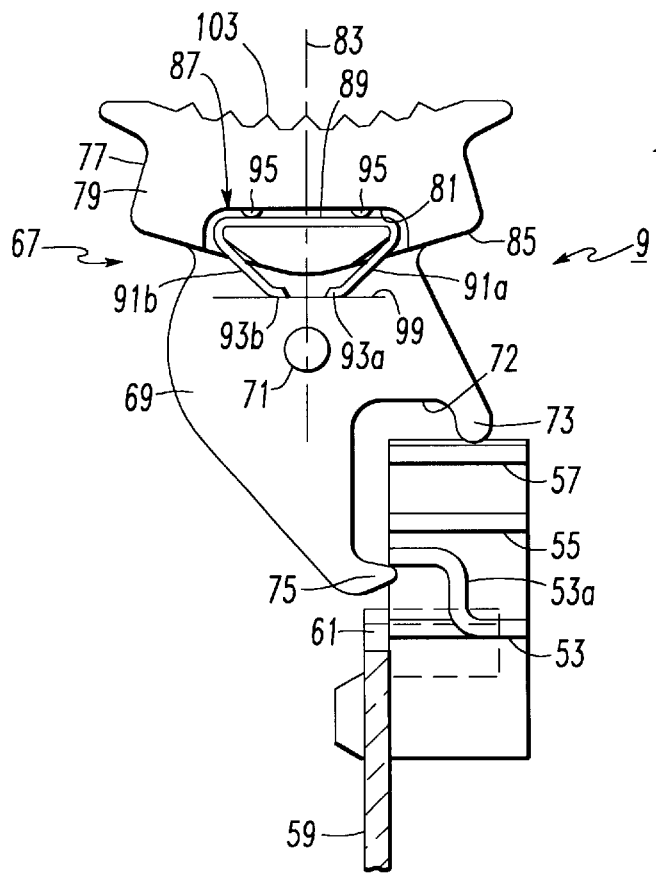
FIGS. 4a and 4b are side and front views, respectively, of the common test switch shown in the neutral position.
Figure 4B:
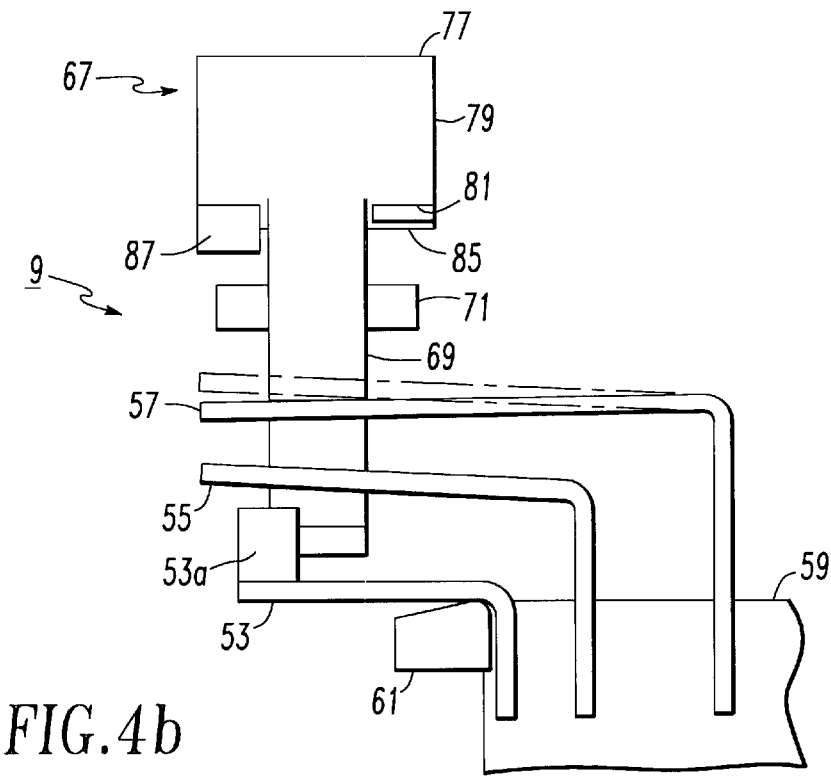

Referring to FIGS. 3, 4a and 4b, the common test button or switch actuator 9 has a molded body 67 with a flat main section 69 from which an integral pivot pin 71 extends from both sides. The main section 69 of the body has a recess 72 which forms a first actuating finger 73 and an opposed second actuating finger 75. The body 67 of the common test button 9 has a head section 77 which is wider than the main section 69 of the body. Each side face 79 of the head 77 has a groove 81 extending transversely to and centered on an axis 83 of the head which passes through the pivot pin 71. These grooves 81 curve downward at the ends to intersect an undercut surface 85 on the head. These undercut surfaces 85 have a radius at the center and angle upward.

At least one spring is mounted in one of the grooves 81 for biasing the common test button 9. The spring 87 is a leaf spring with a center section 89 and a pair of legs 91a and 91b extending from opposite ends of the center section 89 and converging toward one another. The legs 91a and 91b have confronting, rounded terminal portions 93a and 93b. The spring 87 can be retained in the grooves 81 by integrally molded retaining beads 95 which provide a press fit for the springs 87.

As shown in FIG. 3, a mounting recess 95 is molded into the partition 63 with an escutcheon 97 extending around the opening. A recessed shoulder 99 faces the opening. Under the shoulder 99 is a pair of facing notches 101. The common test button 9 is inserted in the mounting recess 95 with the pivot pin 71 seated in the notches 101. A complementary arrangement of the mounting recess 95, escutcheon 97, shoulder 99 and notches 101 is provided in a facing partition (not shown) so that the dual test button 9 is captured for rotation in a plane 102 transverse to the pivot pin 71.

Figure 5A:
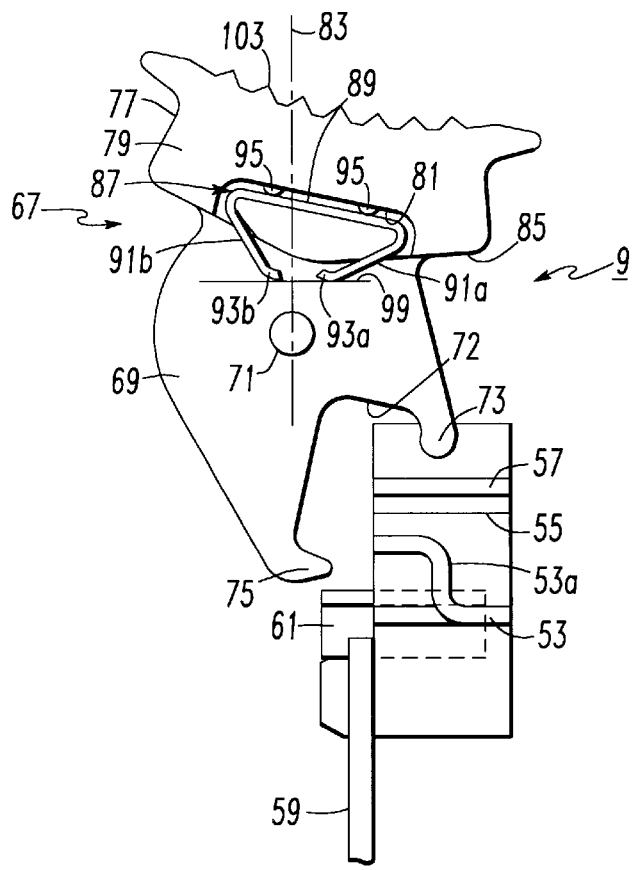
FIGS. 5a and 5b are side and front views, respectively, of the common test switch shown in the ground fault test position.
Figure 5B:
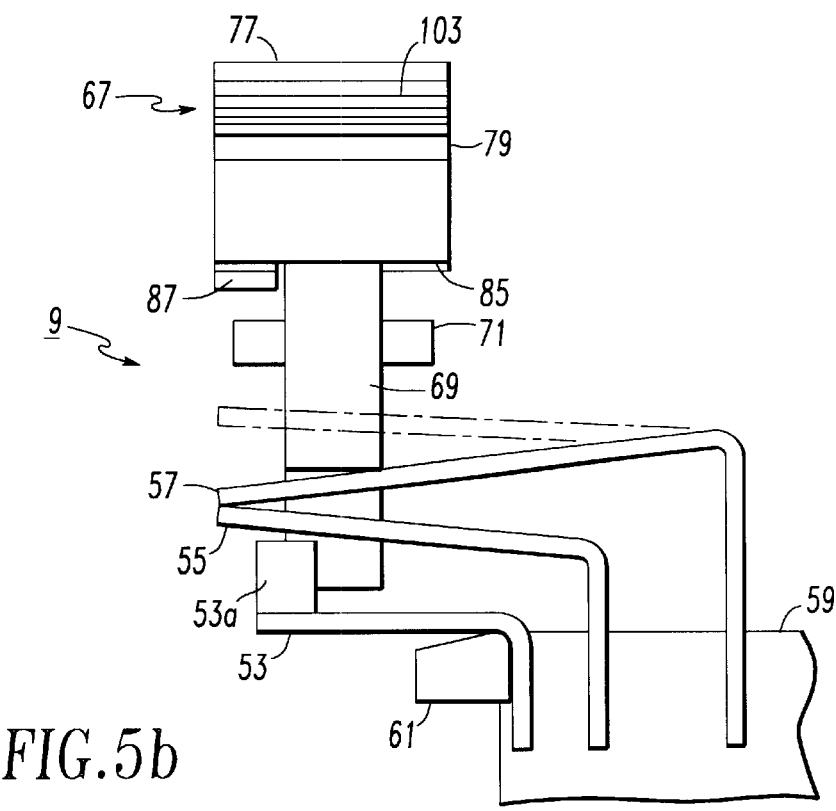

With the common test button 9 seated in the mounting recess 95, the terminal portions 93a and 93b of the springs 87 engage the shoulder 99 and bias the test button to a central, neutral position as shown in FIGS. 4a and 4b. With the common test switch 9 in the neutral position, the opposed actuating fingers straddle the ground fault spring contact arm 57 and the arc fault spring contact arm 53 with the common spring contact arm 55 between them. The head 77 of the dual test button 9 is slightly concave about an axis parallel to the pivot pin and transversely serrated to form a gripping surface 103. The dual test switch 9 is actuated by applying pressure to the gripping surface 103 to rotate the test button about the pivot pin 71. When the test button 9 is rotated clockwise as shown in FIGS. 5a and 5b to a first actuated position, the leg 91a of the spring 87 is deflected thereby generating a bias which returns the switch to the neutral position of FIGS. 4a and 4b when the button is released. Similarly, engaging the gripping surface 103 to rotate the switch in the counterclockwise position brings the switch to the second actuating position shown in FIGS. 6a and 6b in which the spring leg 91b is deflected. Again, when the gripping surface 103 is released the leg 91b of the spring relaxes and returns the switch to neutral. Thus, the dual test button 9 is a rocker switch which can be rocked in opposing directions to either of two actuating positions and is biased to a neutral central position. As shown in FIGS. 4a and 4b, with the dual test button 9 in the neutral position, the actuating fingers 73 and 75 straddle the spring contacts with the first actuating finger 73 above the hot ground fault spring contact 57 and the second actuating finger 75 just below the offset 53a of hot fault arc spring contact 53. Preferably, the actuating finger 73 deflects the ground fault spring contact 57 downward slightly in a neutral position from the unloaded position shown in phantom in FIG. 4b.

When the dual test button switch 9 is rocked clockwise, as shown in FIGS. 5a and 5b, the actuating finger 73 deflects the ground fault spring contact 57 downward until it comes into contact with the common spring contact 55 and therefore closes the ground fault detector test switch 71 to initiate a ground fault test. When the test switch 9 is released, the spring 87 rocks it back to the neutral position of FIGS. 4a and 4b.

Figure 6A:
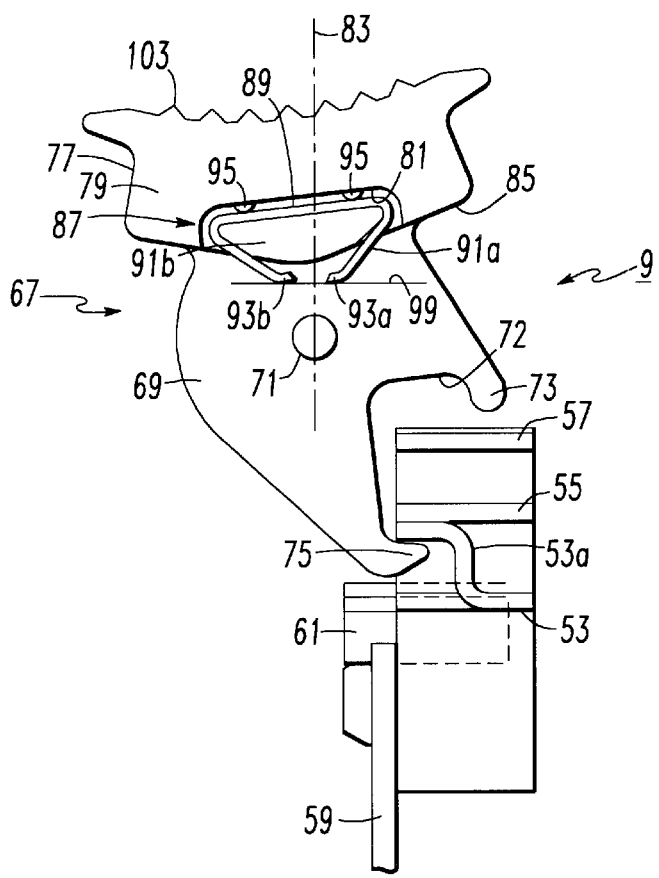
FIGS. 6a and 6b are side and front views, respectively, of the common test switch shown in the arc fault test position.
Figure 6B:
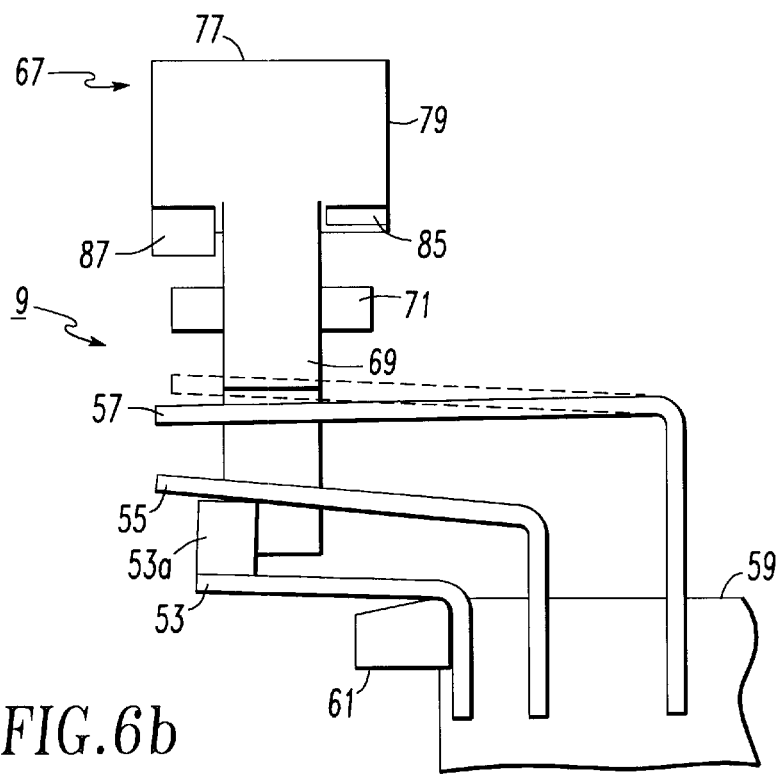

Rocking the dual test button 9 counterclockwise as shown in FIGS. 6A and 6B causes the second actuating finger 75 to lift up the offset portion 53a of the hot arc fault spring contact 53 into engagement with the common spring contact 55 thereby closing the arc fault test switch 47. The offset 53a reduces the distance that the actuating finger 75 has to lift the spring contact 53a as the position of this finger relative to the pivot 75 results in a reduced vertical component when the test button is rotated counterclockwise.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:
   a housing;
   separable contacts mounted in said housing;
   an operating mechanism for opening said separable contacts when actuated;
   trip means for actuating said trip mechanism in response to predetermined current conditions and including ground fault trip means for actuating said trip mechanism in response to a ground fault, and arc fault trip means for actuating said trip mechanism in response to an arc fault;
   test means including a ground fault test circuit having a ground fault test switch for testing said ground fault trip means, and an arc fault test circuit having an arc fault test switch for testing said arc fault means; and
   a common test actuator moveable to a first position for actuating said ground fault test switch, a second position for actuating said arc fault test switch and a neutral position in which neither said ground fault test switch nor said arc fault test switch is actuated.

2. The circuit breaker of claim 1 wherein said common actuator comprises a rocker button rotatable from said neutral position in a first direction to said first position, and in a second direction opposite to said first direction to said second position.

3. The circuit breaker of claim 2 wherein said common actuator includes bias means biasing said rocker button to said neutral position.

4. The circuit breaker of claim 3 wherein said rocker button comprises a body with a laterally extending pivot about which said body rotates in a plane transverse to said pivot, and said bias means comprises at least one leaf spring mounted in said body with a first leg bearing against said housing and biasing said rocker button to said neutral position from said first position, and a second leg bearing against said housing and biasing said rocker button to said neutral position from said second position.

5. The circuit breaker of claim 4 wherein said at least one leaf spring extends in said plane in which said rocker button rotates and has a center section with said first leg and said second leg extending from opposite ends of said center section and converging toward one another.

6. The circuit breaker of claim 5 wherein said body has an axis passing through said pivot, said center section of said at least one leaf spring being transverse to and substantially centered with respect to said axis and with said first and second legs converging toward said pivot, said legs having confronting terminal portions which bear against said housing.

7. The circuit breaker of claim 6 wherein said ground fault test switch and said arc fault test switch each comprise a spring contact arm and an associated second contact, said body of said rocker button having a first actuating finger for bending said spring contact arm of said ground fault test switch into contact with said associated second contact with said rocker button rotated to said first position, and a second actuating arm for bending said spring contact arm of said arc fault test switch into contact with said associated second contact with said rocker button rotated to said second position.

8. The circuit breaker of claim 7 wherein said first actuating finger and said second actuating finger apply a preload to said spring contact of said ground fault test switch and said arc fault test switch respectively with said rocker button in said neutral position.

9. The circuit breaker of claim 7 wherein the second contact associated with the spring contact arm of the ground fault test switch and the second contact associated with the spring contact arm of the arc fault test switch comprise a common second contact.

10. The circuit breaker of claim 9 wherein said common second contact is positioned between said spring contact of said ground fault test switch and said spring contact of said arc fault test switch, and said first actuating finger and said second actuating finger of said rocker button are opposed and straddle said spring contact of said ground fault test switch and said spring contact of said arc fault test switch.

11. The circuit breaker of claim 4 wherein said body of said rocker button has an axis extending through said pivot and a gripping surface on an end of said body substantially transverse to said axis for gripping said rocker button for movement toward said first position and said second position.

12. The circuit breaker of claim 3 wherein said ground fault test switch and said arc fault test switch each comprise a spring contact arm and a common second contact, said rocker button having a first actuating finger for bending said spring contact arm of said ground fault test switch into contact with said common second contact with said rocker button rotated to said first position, and a second actuating finger for bending said spring contact arm of said arc fault test switch into contact with said common second contact with said rocker button rotated to said second position.

13. The circuit breaker of claim 12 wherein said common second contact is positioned between said spring contact arm of said ground fault test switch and said spring contact arm of said arc fault test switch, and said first actuating finger and said second actuating finger of said rocker button are opposed and straddle said spring contact arm of said ground fault test switch and said spring contact arm of said arc fault test switch.

* * * * *